Feb. 15, 1944.   P. B. KAPP   2,341,721
SPRING WHEEL
Filed June 19, 1942   2 Sheets-Sheet 2

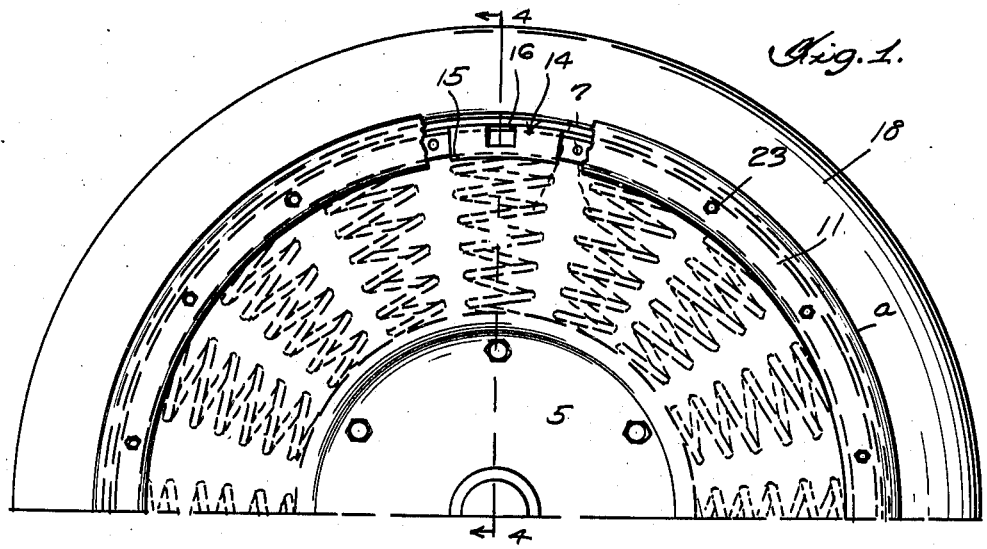
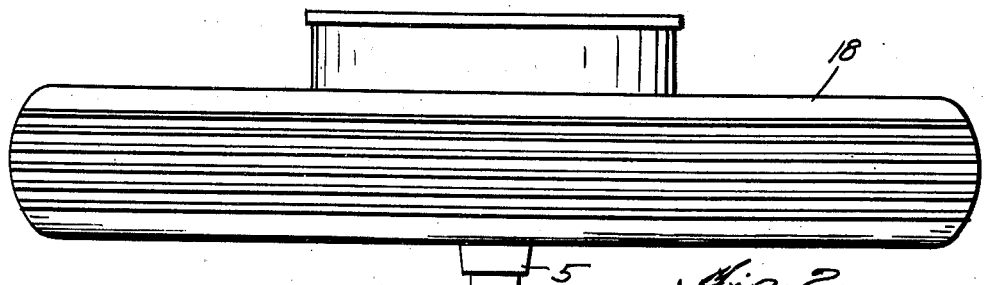
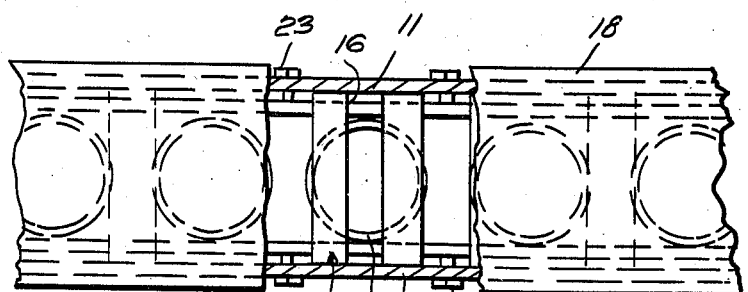

Inventor
Paul Boyd Kapp

By Clarence A. O'Brien
and Harvey B. Jacobson
Attorneys

Patented Feb. 15, 1944

2,341,721

UNITED STATES PATENT OFFICE 2,341,721

SPRING WHEEL

Paul Boyd Kapp, State College, Pa.

Application June 19, 1942, Serial No. 447,637

1 Claim. (Cl. 152—12)

This invention relates to new and useful improvements in wheels which do not depend upon the use of rubber tires.

The principal object of the present invention is to provide a wheel adapted to employ a plastic tread annulus which, in turn, utilizes springs for resiliency.

Another important object of the invention is to provide a wheel structure which can be economically constructed without depending upon the use of rubber and be substantially as practical.

Other objects and advantages of the invention will become apparent to the reader of the following description.

Figure 1 represents a fragmentary side elevational view of the wheel with a portion broken away.

Figure 2 is a top plan view.

Figure 3 is a top plan view with a portion of the tire broken away.

Figure 4:
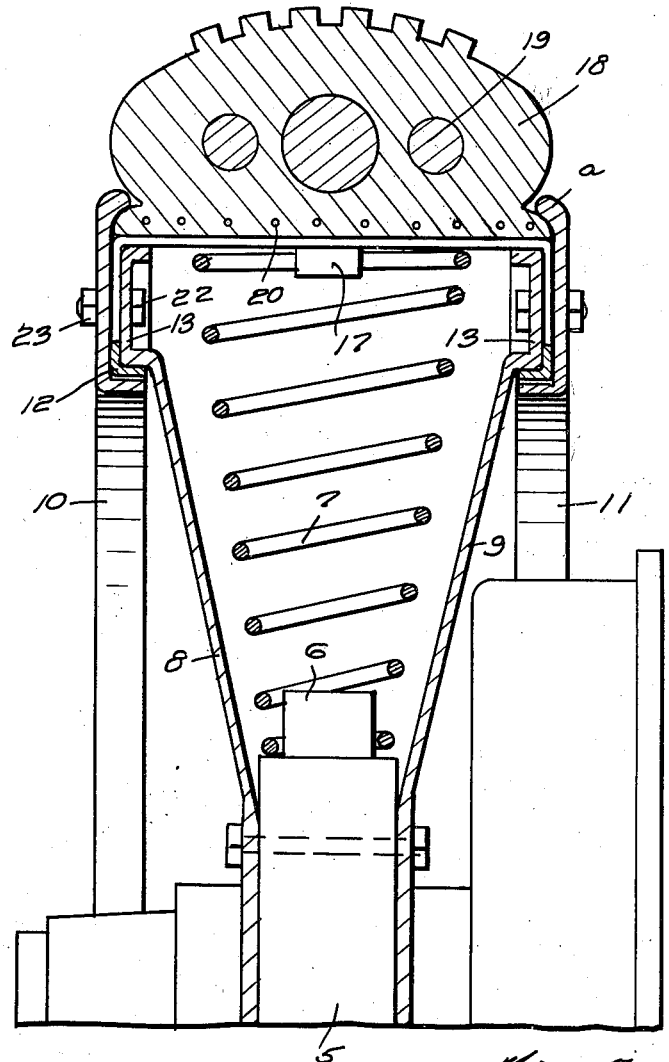
Figure 4 is a section on the line 4—4 of Figure 1.
Figure 5:
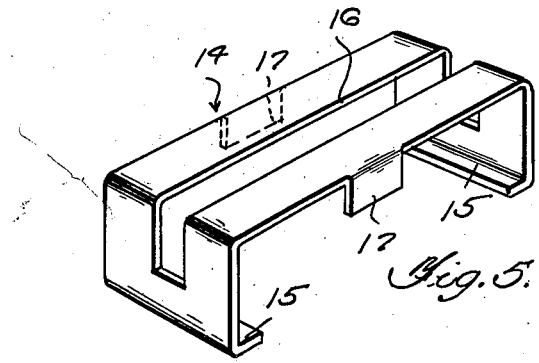
Figure 5 is a perspective view of one of the spring retainers.

Referring to the drawings wherein like numerals designate like parts, it can be seen in Figure 4, that numeral 5 denotes a hub structure which at closely spaced intervals is provided with radially disposed studs 6 adapted to project into the innermost convolutions of outwardly flaring helical-shaped springs 7.

Numerals 8, 9 denote the outboard and inboard side walls of a wheel structure which is further made up of annular rim members 10, 11. These rim members are of channeled construction, the outermost flange portions thereof being rather like a beaded edge as indicated by a.

Outer channeled circumferential edge portion 13 of the side walls 8, 9 are arranged in the channels of the rim members 10, 11.

Bridging the edge portions of the walls 8, 9 are spring holders generally referred to by numeral 14. Each of these spring holders comprises a U-shaped sheet metal member, the leg portions of which are turned inwardly as at 15 so that they will be clamped between the inner flanges of the rim members 10, 11 and said edge portions 13. The spring holders 14 are slotted as at 16 along the top sides and substantially down their leg portions and each edge of the top portion has a depending lug 17 for disposition against the outermost convolution of the corresponding spring 7.

Numeral 18 denotes a tire constructed of some suitable plastic material and preferably having cores 19 of some resilient material. The side portions of the tire 13 are indented to receive the beaded outer edge portions a of the rim members 10, 11 and in order to strengthen the tire 18 it is preferable to have circumferentially disposed wire members 20 disposed embeddedly in the same. The outermost portion of the tire 18 may be marked with treads of any design desired.

Bolts 22 equipped with nuts 23 are disposed through the channeled outermost portions 13 of the walls 8, 9 and through the rim members 10, 11. Thus the rim members are secured to the side walls 8, 9, and the spring holders 14 serve to bridge and hold these side walls and rim members in definite spaced relation and in clamped position against the tire 18.

It can be seen, that the tire 18 being of some flexible plastic material, will have a tendency to flex inwardly, and in turn, flex the holder 14, which flexation exerts pressure against the corresponding spring 7 and also flexes inwardly the side walls 8, 9 of the wheel structure. In this manner, a resilient action will take place that will simulate to a considerable extent the action of a pneumatic wheel.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a wheel structure, a pair of side walls having laterally offset outer circumferential edges, a pair of internally channeled clincher rings opposed to said outer edges, respectively, and surrounding the same, a clincher-type tire interposed between said rings, means securing said rings to said edges, and tire-supporting members bridging said edges and circumferentially spaced around the same, said members having right angled ends interposed between said edges and said rings and clamped between the same.

PAUL BOYD KAPP.